United States Patent
Rentschler et al.

(10) Patent No.: US 6,599,351 B1
(45) Date of Patent: *Jul. 29, 2003

(54) ANTI-CORROSIVE WHITE PIGMENTS AND METHOD FOR PRODUCING THE SAME

(75) Inventors: Thomas Rentschler, Krefeld (DE); Fritz Muller, Duisburg (DE); Jochen Winkler, Rheurdt (DE); Wolf-Rudiger Karl, Duisburg (DE); Kirsten Fohr, Kamp-Lintfort (DE)

(73) Assignee: Metallgesellschaft Aktiengesellschaft, Frankfun am Main (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/719,298

(22) PCT Filed: Jun. 8, 1999

(86) PCT No.: PCT/EP99/03928

§ 371 (c)(1), (2), (4) Date: Apr. 4, 2002

(87) PCT Pub. No.: WO99/65994

PCT Pub. Date: Dec. 23, 1999

(30) Foreign Application Priority Data

Jun. 12, 1998 (DE) .......... 198 26 379

(51) Int. Cl.$^7$ .......... C09C 1/36; C09D 5/08; C09D 5/44
(52) U.S. Cl. .......... 106/14.12; 106/14.05; 106/14.21; 106/430; 106/436; 106/439; 106/442; 106/443; 428/403; 428/404
(58) Field of Search .......... 106/439, 442, 106/443, 14.05, 14.12, 14.21, 430, 436; 428/403, 404

(56) References Cited

U.S. PATENT DOCUMENTS

| | | | | | |
|---|---|---|---|---|---|
| 3,345,187 | A | * | 10/1967 | Binnis | 106/14.37 |
| 3,556,828 | A | * | 1/1971 | Durrant et al. | 106/438 |
| 3,560,234 | A | * | 2/1971 | Holbein | 106/428 |
| 3,926,660 | A | * | 12/1975 | Holle et al. | 106/430 |
| 5,114,486 | A | * | 5/1992 | Demosthenous et al. | 106/427 |
| 5,886,069 | A | * | 3/1999 | Bolt | 106/286.4 |
| 6,342,099 | B1 | * | 1/2002 | Hiew et al. | 106/438 |

* cited by examiner

Primary Examiner—Anthony J. Green
(74) Attorney, Agent, or Firm—Antonelli, Terry, Stout & Kraus, LLP

(57) ABSTRACT

Anticorrosive white pigments useful for inhibiting corrosion include surface-coated $TiO_2$ base bodies, preferably in the rutile modification, having $Mn_3(PO_4)_2$ and one or more of the substances chosen from aluminum oxides, aluminum hydroxides, aluminum phosphates, aluminum hydrogen phosphates, aluminum dihydrogen phosphates and aluminum polyphosphates are precipitated on to the $TiO_2$ base bodies. $Mn_3(PO_4)_2$ may be replaced completely or partially by $Zn_3(PO_4)_2$. Phosphates and/or oxides of cerium may be additionally deposited singly, or several of them may be deposited, on to the $TiO_2$ base bodies.

17 Claims, 4 Drawing Sheets

ANTI-CORROSIVE WHITE PIGMENTS AND METHOD FOR PRODUCING THE SAME

BACKGROUND OF THE INVENTION

The invention relates to anticorrosive white pigments, consisting of $TiO_2$ base bodies, preferably in the rutile modification and which have been surface modified, and to a method for producing the same, as well as to the use thereof.

Usually, $TiO_2$ pigments having a particle size of 0.4 to 8.0 µm and an average grain distribution $d_{50}$ of 0.1 to 1.0 µm are required in order to lighten dark media, or are used to give coating materials covering power. $TiO_2$ pigments are all the more better suited for this the more the refraction of light of the pigments is superior to the refraction of light of the binding agent. The properties of coatings are substantially influenced by the incorporated $TiO_2$ pigments. This behaviour in terms of application technique is adjusted during the production of the $TiO_2$ pigments. This relates not only to the optical properties, such as scattering power, brightness and lustre, but also to further parameters, such as weather resistance, dispersability, settling behaviour and wettability.

The increasing importance of corrosion prevention and recognition of the health risks originating from known anticorrosive pigments which contain lead and chromate, has led to the development of less toxicologically harmful anticorrosive pigments based on phosphates, in particular $Zn_3(PO_4)_2$, as well as molybdate pigments, tungstate pigments and zirconate pigments, metallic zinc, organic pigments and pure barrier pigments, such as micaceous iron ore. Anticorrosive pigments consisting of combinations of phosphates with borates or silicates are also known (Ruf, J.: Organischer Metallschutz, Vincentz Publishing House, Hannover 1993, in particular pages 248 to 289).

$TiO_2$ pigments in the rutile modification are known from DE-A-2 951 805, the surface of the $TiO_2$ pigments being coated with a first layer of cerium radicals and phosphate radicals and with a second layer of aluminium radicals and phosphate radicals to give improved optical properties. GB-B-2 115 394 describes $TiO_2$ pigments which are surface-coated to improve the light stability and to make them suitable for use in laminates. $TiO_2$ pigments having a corrosion-inhibiting action, the particles of which are sheathed with an outer layer of hydrated silicon dioxide, hydrated aluminium oxide or a mixture of these two components, are the subject matter of EP-B-0 412 686. Cations which effect corrosion prevention by means of ion exchange are chemically fixed to the coating, which cations consist of Ca ions, Zn ions, Li ions, Ba ions, Mg ions, Sr ions, Co ions or Pb ions. EP-A-0 595 341 refers to a coating material which contains $TiO_2$ pigments which are coated with 1 to 10% by weight of a zinc alloy and are used for corrosion prevention. DE-C-2 200 656 deals, among other things, with $TiO_2$ pigments with molybdate deposited on the particle surface thereof, which pigments are used as a corrosion-inhibiting admixture in coating materials. In accordance with US-A-4 017 315, such a coating can additionally contain metal phosphate. $TiO_2$ pigments which are coated with lead chromate, strontium chromate or barium chromate or lead benzoate or calcium plumbate and are used as a corrosion-inhibiting admixture in coating materials are presented in GB-A-1 044 350. Additionally, a coating of one or more metal oxides and/or a phosphate can be applied. CZ-B-235 851 proposes, among others, $TiO_2$ pigments which are coated with a layer of $Mn_3(PO_4)_2$ and mixed with varnishes for the purpose of corrosion prevention.

The $TiO_2$ pigments usually used in practice today as white pigments and fillers in varnishes and dyes have excellent optical properties in the incorporated medium because of their grain size of 0.1 to 1.0 µm, which optical properties are characterised above all by light scatter.

SUMMARY OF THE INVENTION.

This object is achieved by anticorrosive white pigments comprising surface-coated $TiO_2$ base bodies, preferably in the rutile modification, characterised in that $Mn_3(PO_4)_2$ and one or more of the substances chosen from aluminum oxides, aluminum hydroxides, aluminum phosphates, aluminum hydrogen phosphates, aluminum dihydrogen phosphates and aluminum polyphosphates are precipitated on to the $TiO_2$ base bodies.

DETAILED DESCRIPTION OF THE PREFERRED EMBODIMENTS

Figure 1:
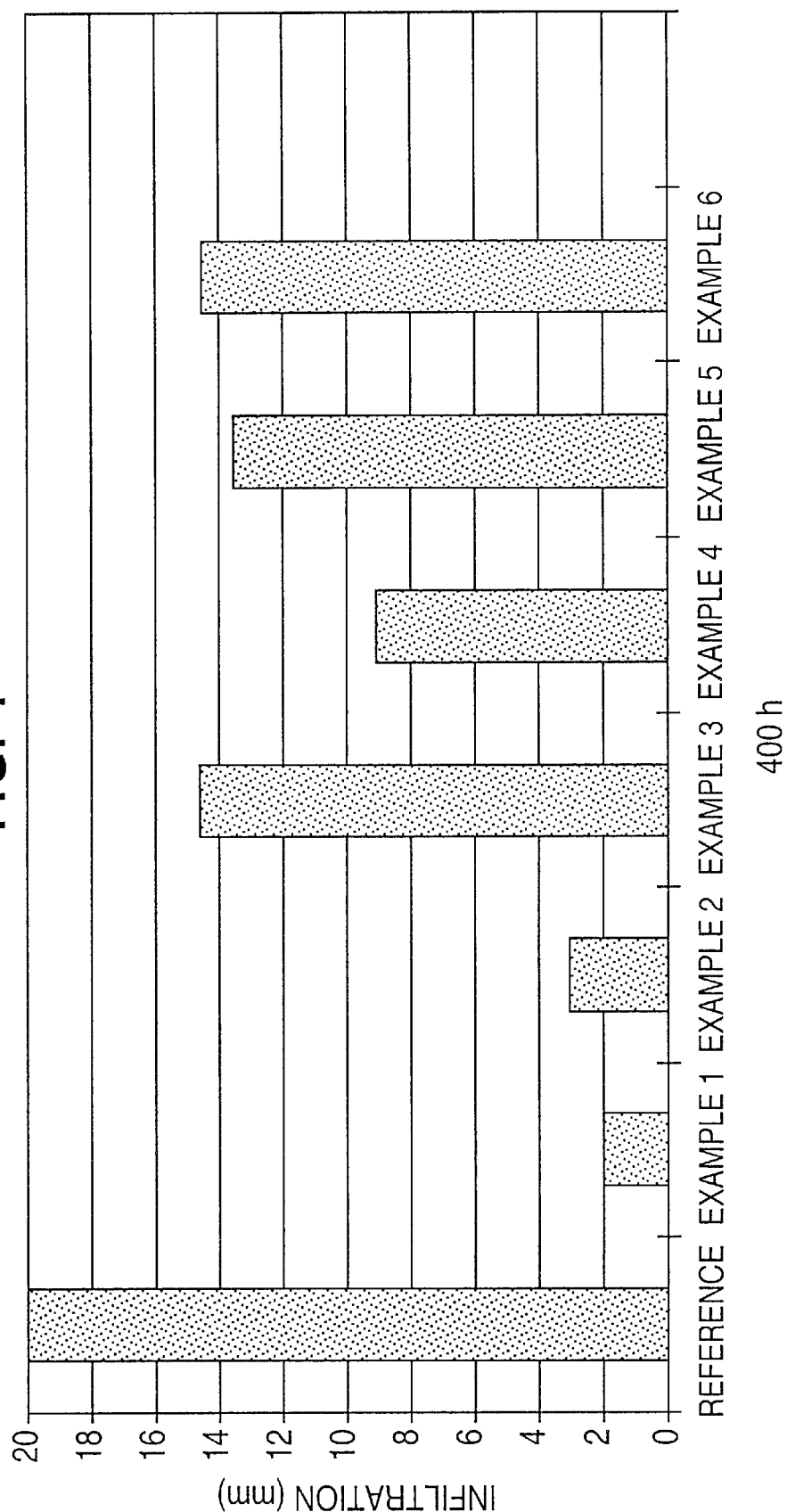
FIG. 1 is a bar graph showing the average total width of the infiltration zone of a reference sample and examples of the present invention after 400 hours of a salt spray test.

The anticorrosive white pigments of the present invention comprise surface-coated $TiO_2$ base bodies, preferably in the rutile modification, characterized in that $Mn_3(PO_4)_2$ and one or more of the substances chosen from aluminum oxides, aluminum hydroxides, aluminum phosphates, aluminum hydrogen phosphates, aluminum dihydrogen phosphates and aluminum polyphosphates are precipitated on to the $TiO_2$ base bodies. $Mn_3(PO_4)_2$ may be replaced completely or partially by $Zn_3(PO_4)_2$. Phosphates and/or oxides of cerium may be additionally deposited singly, or several of them may be deposited, on to the $TiO_2$ base bodies.

The proportions of the substances, in weight relation to the $TiO_2$ content, may amount to:

0.1 to 15% manganese
0.1 to 15% zinc
0.1 to 15% $Al_2O_3$
0.1 to 5% $CeO_3$.

Preferably, the proportions of the substances, in weight relation to the $TiO_2$ content, may amount to:

0.1 to 3% manganese
0.1 to 6% zinc
0.1 to 6% $Al_2O_3$, and
0.1 to 2.5% $CeO_3$.

The anticorrosive white pigments can be produced by a method using an aqueous solution in which soluble, inorganic and/or organic metal compounds of aluminum, of manganese and/or of zinc and/or of cerium and/or of phosphorous compounds are contained. Alkali aluminates, aluminum sulphates, aluminum hydroxides and aluminum halides can be used singly, or several of them can be used, as aluminum compounds. Manganese nitrates, zinc nitrates and cerium nitrates, manganese carbonates, zinc carbonates and cerium carbonates, manganese hydroxides, zinc hydroxides and cerium hydroxides, manganese sulphates, zinc sulphates and cerium sulphates, manganese halides, zinc halides and cerium halides, manganese acetates, zinc acetates and cerium acetates, manganese oxalates, zinc oxalates and cerium oxalates and comparable organic salts can be used singly, or several of them can be used, as manganese compounds and/or zinc compounds and/or cerium compounds. Phosphoric acid can be replaced completely or partially by one or more of the phosphate components such as phosphorus pentoxide, alkali phosphate, alkali hydrogen phosphate, dihydrogen phosphate, pyrophosphate, triphosphate and polyphosphate.

The precipitation of the surface coating can be carried out continuously or discontinuously. The precipitation can take place in a plurality of stages one after the other or by simultaneous addition of a plurality of components. The precipitation of the aluminum compounds can take place at the end.

The anticorrosive white pigments can be ground in a jet mill. The pigments can be subjected to a thermal processing at temperatures of 400 to 1000° C.

The anticorrosive white pigments may be used for coatings, in particular for electrophoresis varnishes for cathodic or anodic dip varnishing. The anticorrosive white pigments may be used for primers, base varnishes, covering varnishes and suchlike based on aqueous binding-agent systems or binding-agent systems having organic solvents, for example in the automobile industry, in watercraft construction and for the protection of buildings.

The production of the anticorrosive white pigments in accordance with the invention is explained in greater detail and by way of example in the following.

An aqueous $TiO_2$ suspension of 12 l, containing 300 g $TiO_2$/l with an average particle size $d_{50}$ of 0.35 µm, is heated to a temperature of 80° C. whilst being stirred continuously. The pH value is adjusted and kept constant during the subsequent treatment, as required in each case, by means of NaOH or $H_2SO_4$. In a multi-stage precipitation, the individual components are precipitated stoichiometrically, with constant stirring and maintaining of the pH value and the temperature, on to the surface of the $TiO_2$ base bodies. After a maturing time of 2 hours with continuous stirring, the resulting product is in each case filtered off, washed with demineralised water, dried and subsequently ground in a jet mill.

By means of these method measures, the following anticorrosive white pigments composed in accordance with the invention were produced:

1. $TiO_2$ base bodies sheathed with a layer of Ce/Mn/Al/$PO_4$,
2. $TiO_2$ base bodies sheathed with a layer of Mn/Al/$PO_4$,
3. $TiO_2$ base bodies sheathed with a layer of Ce/Zn/Al/$PO_4$,
4. $TiO_2$ base bodies sheathed with a layer of Ce/Zn/Al/$PO_4$ (Ce and Zn components are added simultaneously during the production)
5. $TiO_2$ base bodies sheathed with a layer of Ce/Zn/Mn/Al/$PO_4$,
6. $TiO_2$ base bodies sheathed with a layer of Ce/Al/$PO_4$.

These anticorrosive white pigments were incorporated, in each case with 10% or 15% PVK (pigment volume concentration: ratio of the total volume of the pigments in a product to the total volume of the non-volatile constituents), both into a water-based alkyd-resin binding-agent system (trade name: Worleesol 61 A) and into an alkyd-resin binding-agent system based on organic solvents (trade name: Alftalat AM 380) by means of the components being mixed with a dissolver and pre-dispersed, the grinding preparation being dispersed by way of a bead mill and deposited on to degreased steel plates 100×150×1 mm in size and dried. The thickness of the dry layer was 35 to 40 µm. For comparison purposes, degreased steel plates having the same dimensions were each coated with water-based alkyd-resin binding-agent system and also alkyd-resin binding-agent system based on organic solvents, containing 10 or 15% conventional anticorrosive white pigments, consisting of $Zn_3(PO_4)_2$, lithopone, zinc white and $TiO_2$, and dried.

Using a van Laar scratcher, two test plates at a time were provided with a straight scratch parallel to the longitudinal side of the test plates, which scratch went through the coating down to the metallic base. The test plates treated in this way, and two unscratched test plates at a time, were subjected to the salt-spray mist test with a 5.5% NaCl solution according to DIN 51167. The test plates were placed at an angle of 60 to 75° with respect to the horizontal, with the side to be tested facing the spraying. The test temperature was 35±2° C. The duration of the test was set at 400 hours for the test plates coated with alkyd-resin binding-agent system based on organic solvents and at 1000 hours for the test plates coated with water-based alkyd-resin binding-agent system, because after this time was exceeded, the quantitative evaluation of the test plates in terms of corrosion from below and infiltration did not lead to meaningful measurement results or differentiations. The reference test plate which was coated with water-based alkyd-resin binding-agent system was removed from the testing equipment after 500 hours, because it was practically completely destroyed. Blistering and the degree of corrosion from below were assessed visually on two unscratched test plates at a time.

After the removal from the testing equipment, the test plates were rinsed with water. For the evaluation, the average total width of the infiltration zone and the base corrosion zone was determined in mm, from which the width of the original scratch was subtracted. The measurement results for the above-listed exemplifying embodiments 1 to 6 are represented in FIG. 1 to FIG. 4 in the form of bar graphs. A comparison of the measurement results established on the test plates coated with alkyd-resin binding-agent system based on organic solvents with those registered on the test plates coated with water-based alkyd-resin binding-agent system shows that in terms of the behaviour of the coatings in the case of the action of sprayed sodium chloride solution, the extent of the infiltration and corrosion from below of the coating of the water-based protective primer is clearly lower than that in the case of the protective primer based on organic solvents. As a result of this, future environment-related demands can be taken into account.

Figure 2:
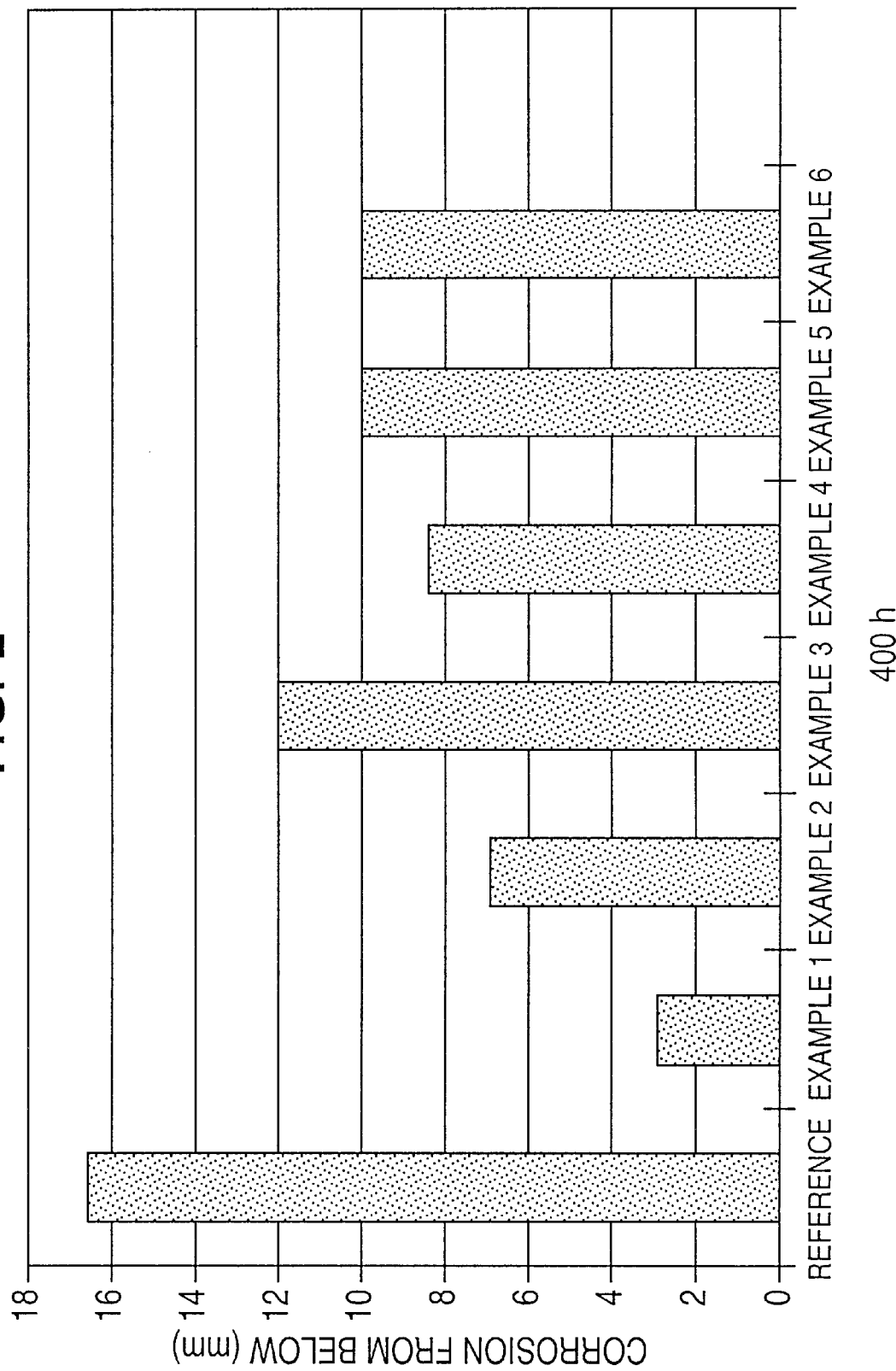
FIG. 2 is a bar graph showing the average total width of the base corrosion zone of a reference sample and examples of the present invention after 400 hours of a salt spray test.
Figure 3:
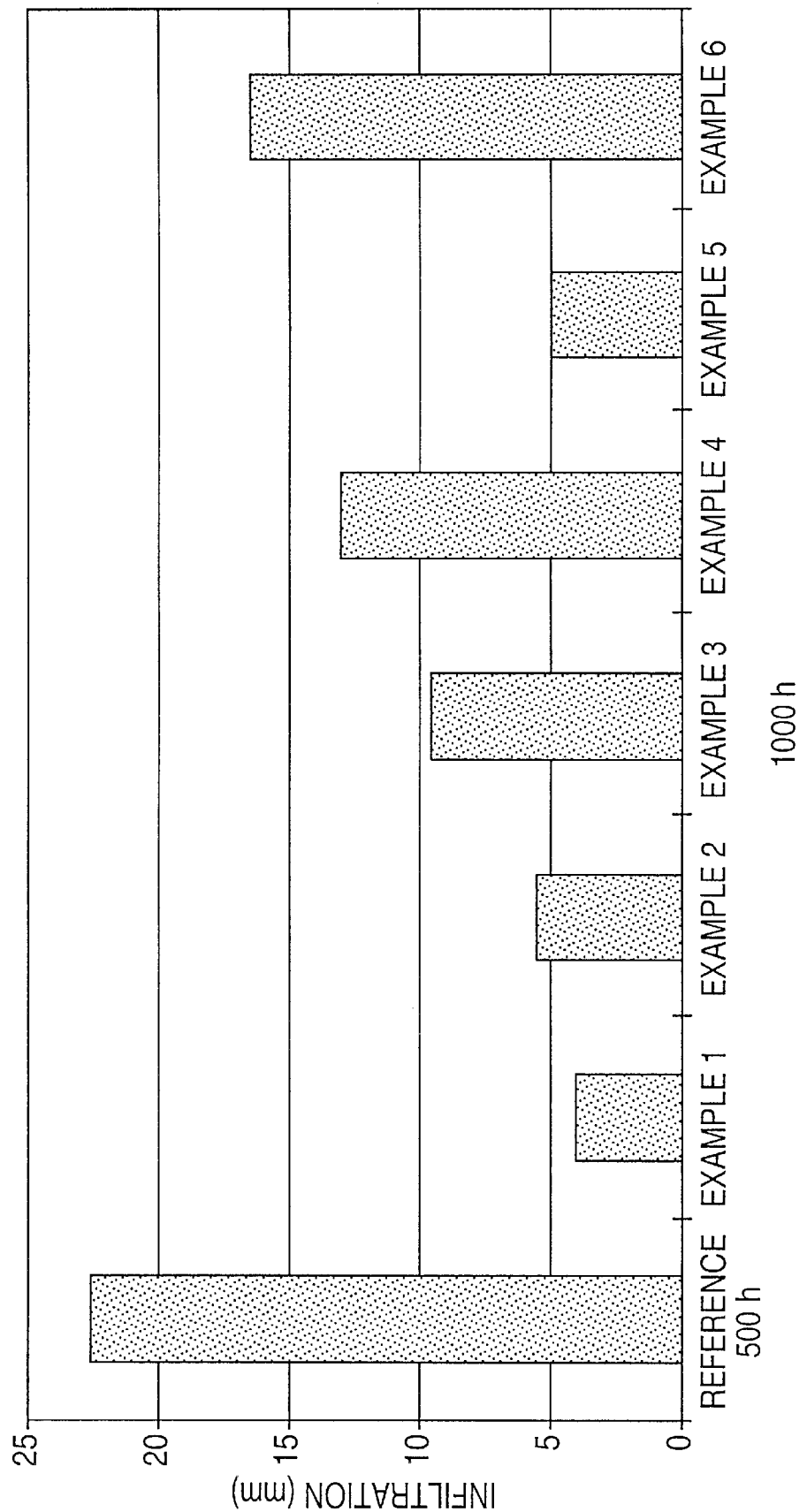
FIG. 3 is a bar graph showing the average total width of the infiltration zone of a reference sample and examples of the present invention after 1000 hours of a salt spray test.
Figure 4:
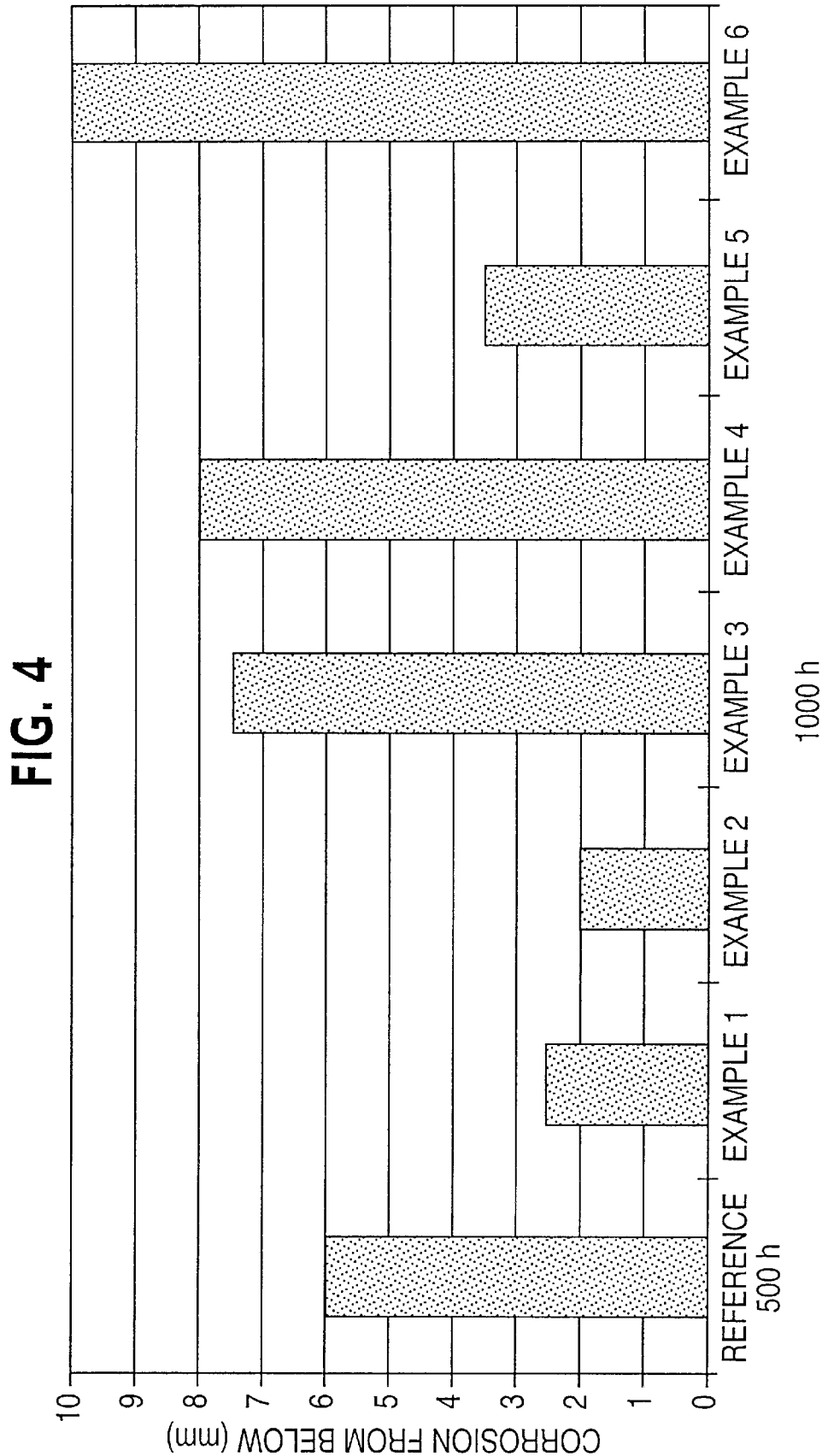
FIG. 4 is a bar graph showing the average total width of the base corrosion zone of a reference sample and examples of the present invention after 1000 hours of a salt spray test.

Moreover, FIG. 1 and FIG. 2 show that the lowest infiltration and corrosion from below of the coating of the protective primer based on organic solvents is achieved when the anticorrosive white pigments of the types $TiO_2$ with Ce/Mn/Al/$PO_4$ and $TiO_2$ with Mn/Al/$PO_4$ are used. A similarly good effect is also achieved with coatings of the water-based protective primer, as FIG. 3 and FIG. 4 show. This positive effect is also achieved by the use of the anticorrosive white pigment of the type $TiO_2$ with Ce/Zn/Mn/Al/$PO_4$.

These results are surprising and unpredictable in so far as zinc phosphates have been established and proven for many years as active anticorrosive pigments.

In addition to their conventional scattering-power effectiveness, the white pigments constituted in accordance with the invention have, as effective $TiO_2$ pigments, a high corrosion-inhibiting action, on the one hand in formulations of cathodic dipping varnishes, such as, for example, in the automobile industry, and, on the other hand, generally in primers and coatings for the protection of buildings, in the marine field, in the automobile sector and suchlike.

What is claimed is:

1. A method for inhibiting corrosion, comprising:

providing anticorrosive white pigments comprising surface coated $TiO_2$ base bodies, and at least one phosphate selected from the group consisting of $Mn_3(PO_4)_2$ and $Zn_3(PO_4)_2$ and at least one aluminum compound selected from the group consisting of aluminum oxides and aluminum hydroxides precipitated on the $TiO_2$ base bodies; and applying the anticorrosive white pigments to a metal base.

2. A method according to claim 1, wherein the $TiO_2$ base bodies have $Mn_3(PO_4)_2$ precipitated thereon.

3. A method according to claim 1, wherein the $TiO_2$ base bodies have $Zn_3(PO_4)_2$ precipitated thereon.

4. A method according to claim 3, wherein at least one of phosphates and oxides of cerium are additionally precipitated on to the $TiO_2$ base bodies.

5. A method according to claim 4, wherein the proportions of substances precipitated on the $TiO_2$ base bodies, in weight percent based on $TiO_2$ content, amount to:

0.1 to 15% manganese 0.1 to 15% zinc 0.1 to 15% $Al_2O_3$ 0.1 to 5% $CeO_3$.

6. A method according to claim 5, wherein the proportions of the substances precipitated on the $TiO_2$ base bodies, in weight percent based on the $TiO_2$ content, amount to:

0.1 to 3% manganese 0.1 to 6% zinc 0.1 to 6% $Al_2O_3$, and 0.1 to 2.5% $CeO_3$.

7. A method according to claim 1, wherein the step of providing the anticorrosive white pigments comprises precipitating the at least one phosphate and the at least one aluminum compound out of an aqueous solution in which soluble, inorganic and/or organic metal compounds of aluminium and manganese and/or of zinc are contained.

8. A method according to claim 7, wherein the soluble, inorganic and/or organic metal compounds of aluminum are selected from the group consisting of alkali aluminates, aluminium sulphates, aluminium hydroxides and aluminium halides.

9. A method according to claim 7, wherein the aqueous solution contains at least one phosphorous compound selected from the group consisting of phosphoric acid, phosphorus pentoxide, alkali phosphate, alkali hydrogen phosphate, dihydrogen phosphate, pyrophosphate, triphosphate and polyphosphate.

10. A method according to claim 2, wherein precipitation of the at least one phosphate and the at least one aluminum compound is carried out continuously.

11. A method according to claim 7, wherein precipitation of the at least one phosphate and the at least one aluminum compound takes place in a plurality of stages one after the other.

12. A method according to claim 7, wherein precipitation of the at least one aluminum compound takes place last.

13. A method according to claim 7, wherein the step of providing the anticorrosive white pigments includes grinding the anticorrosive white pigments in a jet mill.

14. A method according to claim 7, wherein the step of providing the anticorrosive white pigments includes subjecting the anticorrosive white pigments to a thermal processing at temperatures of 400 to 1000° C.

15. A method according to claim 7, wherein precipitation of the at least one phosphate and the at least one aluminum compound is carried out discontinuously.

16. A method according to claim 7, wherein precipitation of the at least one phosphate and the at least one aluminum compound takes place in a plurality of stages one after the other.

17. A method according to claim 1, wherein the at least one phosphate is precipitated first on the $TiO_2$ base bodies and the at least one aluminum compound is precipitated last on the $TiO_2$ base bodies.

* * * * *